July 7, 1942.  C. E. KERR  2,288,719
DENSITY CONTROL
Filed Aug. 8, 1939  2 Sheets-Sheet 1
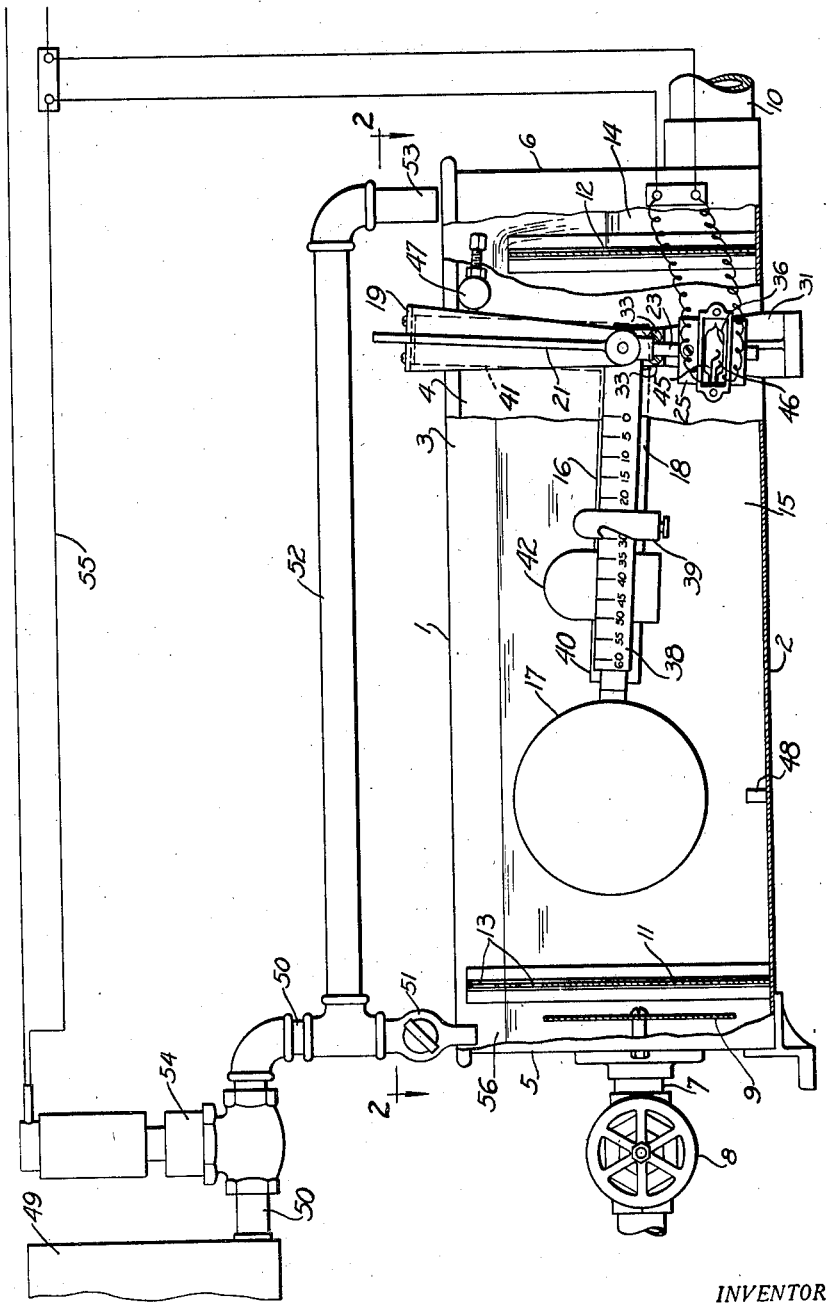
INVENTOR.
CHARLES E. KERR
BY Philip A. Minnis
ATTORNEY July 7, 1942.  C. E. KERR  2,288,719
DENSITY CONTROL
Filed Aug. 8, 1939  2 Sheets-Sheet 2
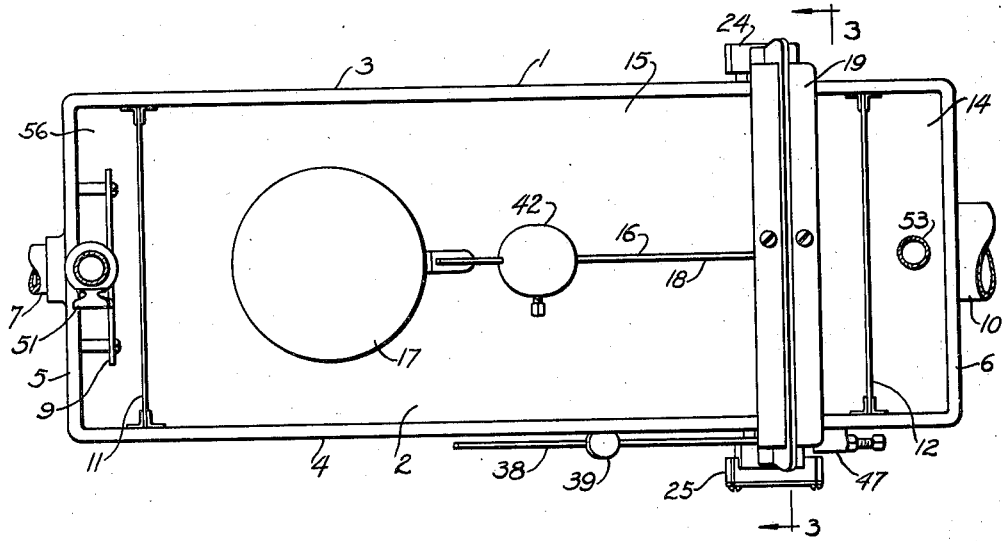
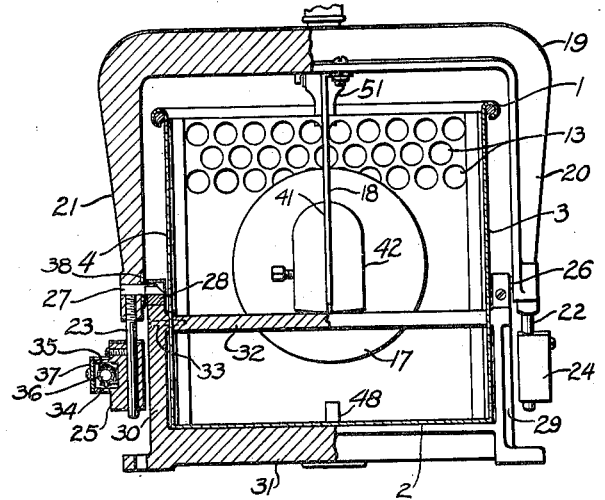
INVENTOR.
CHARLES E. KERR
BY Philip A. Minnis
ATTORNEY Patented July 7, 1942

2,288,719

UNITED STATES PATENT OFFICE 2,288,719

DENSITY CONTROL

Charles E. Kerr, Hoopeston, Ill., assignor to Food Machinery Corporation, San Jose, Calif., a corporation of Delaware Application August 8, 1939, Serial No. 288,994

4 Claims. (Cl. 137—78)

The present invention appertains to the control and regulation of the specific gravity or density of liquids.

In the control and regulation of the density of liquids, as, for instance, brine solutions, or the like, it is customary to employ devices responsive to variations in the specific gravity thereof, which include apparatus operated thereby, to admit renewal material to the liquid to be controlled for maintaining its density constant.

Density control devices of the type above referred to consist primarily of a control tank within which the density responsive mechanism is arranged and through which the liquid to be controlled is directed, and include further mechanism for supplying renewal solution to the liquid in the control tank or to the liquid flowing from the same.

These arrangements, however, have the disadvantage that they do not promote a uniform restoration of the density of the controlled liquid, due to lag in distribution of the renewal solution throughout the entire liquid body, and considerable inaccuracies in the specific gravity thereof result.

In other words, upon admission of renewal solution into the control tank, effected by the operation of the density responsive mechanism, the density of the fluid within the tank is rapidly restored and the admission of renewal solution is discontinued before the density of the entire liquid body has been restored.

On the other hand, when the renewal material is admitted to the liquid flowing from the control tank, a considerable time may elapse before reconditioned liquid will enter the control tank and cause discontinuance of the renewal solution supply. The resulting lag in the operation of the density responsive mechanism causes addition of a greater amount of make-up material than will be necessary to maintain the density of the controlled liquid at a predetermined degree, and obviously, considerable inaccuracies in specific gravity of the liquid body to be controlled will result.

It is, therefore, the primary object of the present invention to provide an apparatus, for controlling the density of liquids, which is highly sensitive and immediately responsive to variations in density, and in which the premature actuation or the objectionable lag in operation of the density responsive mechanism have been entirely eliminated.

Another object of the present invention is the provision of a liquid density control apparatus for maintaining the specific gravity of a liquid constant, by immediately restoring the desired density, up fluctuation of the same, in a uniform and gradual manner throughout the entire liquid body.

Other and further objects of the present invention in addition to those specifically enumerated will be best understood from the following description taken in connection with the accompanying drawings illustrating an embodiment of the present invention. It is, however, to be understood that the present invention is not limited to the specific construction disclosed herein, as many modifications may be made within the purview of the appended claims.

In the drawings:

Fig. 1 illustrates a side elevation of the density control apparatus of the present invention, certain parts being broken away while others are shown in section.

Fig. 2 is a plan view of the control tank of the apparatus, shown in Fig. 1, certain parts associated therewith being shown in section.

Fig. 3 is a transverse section of Fig. 2 taken along lines 3—3 thereof.

Referring now to the drawings, and especially to Fig. 1 thereof; I indicates a control tank comprising the bottom 2, the side walls 3 and 4, and the end walls 5 and 6.

This control tank I is further provided with an inlet conduit 7 attached to the end wall 5, and provided with a control valve 8 for admitting liquid, the density of which is to be controlled, to the tank I.

Mounted adjacent the inlet conduit 7 within the tank is a baffle plate 9, adapted to prevent eddy currents of the liquid entering the tank. Leading from the lower portion of the end wall 6 is an outlet pipe 10, adapted to return the liquid entering the tank I from a place of use back to the same.

Positioned within the tank I, between the inlet and outlet conduits thereof, is a baffle plate II and a partition 12. The baffle plate II is located adjacent the baffle plate 9 previously referred to, and is provided at its upper portion with perforations 13, while the partition 12 is not perforated and is of such dimensions as to form an overflow for the liquid for maintaining the same at a predetermined level within the tank. The liquid entering the outlet compartment 14 formed between the end wall 6 and the partition 12 above referred to is discharged therefrom by means of the pipe 10 and returned to its place of use.

Arranged within the control tank section 15, between the baffle plate 11 and the partition 12, is a density responsive mechanism 16 which comprises a float 17 and an L-shaped supporting arm 18, to which the float 17 is attached. The arm 18 is pendently supported by a yoke 19 which extends transversely over the control tank 1 and includes the downwardly extending portions 20 and 21, which are provided with depending rods 22 and 23, threadedly secured to the yoke portions 20 and 21 respectively, and provided with adjustable counterweights 24 and 25.

Mounted within the lower yoke arm portions 20 and 21 of the yoke 19 are agate bearing members 26 and 27 which are held in place by the threaded rods 22 and 23 in a manner as will be clearly seen from Fig. 3.

The agate bearings 26 and 27 cooperate with complementary agate bearing members 28 supported by standards 29 and 30, which form a portion of a base casting 31 within which the control tank 1 is arranged. The complementary agate bearing members 28 are of exactly the same construction, and only one of the same has been illustrated in Fig. 3.

Interposed between the standards 29 and 30 within the control tank 1 is a horizontally extending brace 32, held in position by means of screws 33, securing the uprights of the casting 31 in proper position relative to the tank to prevent any deformation thereof.

The counterweight 25 is provided with the recess 34 within which a spring clamp 35 is positioned for supporting a mercury switch 36 therein. The mercury switch 36 is protected against damage by means of a cover plate 37 attached to the counterweight 25 in any convenient manner.

The yoke structure 19 is further provided with a graduated beam 38, positioned exteriorly of the tank and provided with a sliding weight 39. The graduated beam 38 extends parallel to the horizontal portion 40 of the supporting arm 18 and in a like manner, the vertical portion 41 of the supporting arm 18 is positioned parallel to the downwardly extending portions 20 and 21 of the yoke 19. A slidable weight 42 upon the horizontal portion of the supporting arm 18 permits calibration of the apparatus to zero, or water balance.

With the parts thus far described, it will be seen that the entire density responsive mechanism 16 is rockably supported upon the agate bearings 28, so that when the float 17 rises or falls, within the liquid in the tank, within which it is completely submerged, the contacts 45 and 46 of the mercury switch 36 will be opened or closed correspondingly.

Limit stops 47 and 48 confine the movements of the density responsive mechanism within predetermined limits sufficient to produce opening and closing of the mercury switch, as stated hereinbefore.

Mounted above the control tank 1 is supply tank 49 adapted to contain make-up material or renewal solution, such as concentrated brine solution or the like. This supply tank 49 is provided with a discharge conduit 50 and a discharge valve 51 for admitting renewal solution into the control tank 1.

The discharge valve 51 extends into the tank between the end wall 5 and the baffle plate 11, so that renewal solution admitted thereby will be mixed with the liquid entering the control tank before the same comes into contact with the float 17.

A by-pass conduit 52 in communication with conduit 50 extends longitudinally above the control tank 1 and is provided with a downwardly extending discharge spout 53 for discharging make-up solution from the supply tank 49 into the compartment 14 of the tank 1 and to the liquid discharging therefrom.

The conduit 50 is furthermore provided with a solenoid valve 54, which may be of any conventional construction, and the solenoid of which is connected by means of an electrical circuit 55 with the contact 45 and 46 of the mercury switch 36 and a source of electric energy, so that upon closing of the mercury switch, the solenoid of the valve 54 is energized, causing opening of the solenoid valve 54 for admitting renewal solution to the tank. When the mercury switch 36 is opened upon corresponding rocking movement of the density responsive mechanism, the solenoid of the solenoid valve 54 is de-energized, and the admission of make-up material will cease.

When the solenoid valve 54 is opened, the largest volume of renewal solution will be admitted to the tank 1 over the by-pass conduit 52, and only a comparatively small volume will be admitted over the valve 51 to the liquid to be controlled.

It will be seen that when the liquid controlled by the apparatus of the present invention enters the control tank 1 over the pipe 7, the same will rise within the inlet compartment 56 formed between the end wall 5 and the baffle 11 of the tank 1, and will enter through the perforations 13 of the baffle plate 11, into the intermediate compartment 15 of the control tank within which the density responsive mechanism is positioned.

The valve 8 is so adjusted that such a volume of liquid will be admitted to the control tank that the same overflows the partition 12 with a depth of one-fourth to three-eighths of an inch, into the compartment 14 of the tank, from which it is freely discharged over the pipe 10 and returned to its place of use.

The weight 39 is set adjacent the desired calibration of the beam 38 which indicates the desired density in degrees Baumé, at which the liquid is to be maintained constant, and if the density of the liquid to be controlled is correct, the float 17 will rise to its uppermost position, and the supporting structure of the float which includes the supporting arm 18 and the yoke 19 will be rocked to a position as shown in Fig. 1, at which the yoke engages the limit stop 47. Consequently, with the parts in position as illustrated in Fig. 1, the mercury switch 36 will be held in open position, and the solenoid of the solenoid valve 54 is de-energized so that this valve is held in closed position, and no renewal solution is admitted to the liquid in tank 1. However, as soon the specific gravity of the liquid within the tank 1 drops below the predetermined degree, float 17 will sink, effecting rocking of the supporting arm 18 and yoke 19 in an opposite direction, until the float engages the lower limit stop 48. This will produce closing of the contacts of the mercury switch 36 and energization of the solenoid of the solenoid valve 54, causing opening of the latter. Make-up solution will now be admitted over conduit 50, control valve 51 and by-pass conduit 52, and spout 53, to the liquid within the sections 56 and 14 respectively, of the control tank 1. The largest volume of the renewal solution is discharged into section 14 of the tank 1 and will be admixed with the liquid returned from the tank to its place of use, but only a comparatively small volume of said renewal solution will be discharged from the control valve 51 and intermingle with the liquid entering the tank, so that while concentrated make-up solution is admitted to the liquid flowing from the tank, only a proportional amount of said make-up solution is admitted to the liquid entering the tank. Therefore, the density of the liquid to be controlled within the portion 15 of tank 1 will be raised in proportion to the volume of renewal solution admitted to the liquid discharged from tank 1, effecting rising of the float 17 and closing of the solenoid valve 54 before too much make-up solution has been added to raise the specific gravity of the entire liquid body to be controlled beyond the desired degree. In this way, the addition of an insufficient or too great a volume of renewal solution is effectively prevented; the lag in operation inherent in the devices of the nature referred to herein, due to the time required for even distribution of the renewal solution throughout the entire liquid body inclusive of the portion of the liquid within the control tank 1, is entirely eliminated; and an absolute correct maintenance of the specific gravity of the controlled liquid is obtained.

The control valve 51 has to be properly adjusted in accordance with the size of the control tank 1 and the volume of liquid admitted thereto by the pipe 7, to obtain the most satisfactory results.

While I have described herein a particular type of density responsive apparatus, with which the present invention may be advantageously used, it is to be understood that the same is equally well adaptable in connection with other density responsive devices, as will be obvious to those skilled in the art.

Having now described my invention and in what manner the same may be used, what I claim as new and desire to protect by Letters Patent is:

1. In an apparatus for controlling the density of a liquid flowing through a system wherein said liquid is circulated to and from a place of use, density responsive means disposed in said system for actuation by said liquid, adjustable flow controlling means for admitting predetermined relatively proportional amounts of renewal material to said liquid at spaced points in said system, one of said points being so located in advance of said density responsive means that the entire volume of renewal material admitted at such point together with the liquid to which it is added flows past said density responsive means before passing to said place of use, the other of said points being located beyond said density responsive means so that the renewal material there admitted will not affect said density responsive means before passing to said place of use, and means actuated by said density responsive means for controlling the flow of renewal material to said admission means.

2. In an apparatus for controlling the density of a liquid flowing through a system wherein said liquid is circulated to and from a place of use, density responsive means disposed in said system for actuation by said liquid, means for admitting proportional amounts of renewal material to said liquid at spaced points in said system, one of said points being located in advance of said density responsive means whereby the renewal material so admitted flows past said density responsive means before passing to said place of use, the other of said points being located beyond said density responsive means so that the renewal material there admitted will not affect said density responsive means before passing to said place of use, means actuated by said density responsive means for controlling the flow of renewal material to said admitting means, and means for varying the proportional relation between the amounts of renewal material admitted at said spaced points.

3. In an apparatus for controlling the density of a liquid flowing through a system wherein said liquid is circulated to and from a place of use, density responsive means disposed in said system for actuation by said liquid, a pipe for admitting renewal liquid to said system at a point in advance of said density responsive means whereby it flows past said density responsive means before passing to said place of use, a branch pipe leading from said first named pipe for admitting renewal solution to said system at a point beyond said density responsive means so that the renewal material there admitted will not affect said density responsive means before passing to said place of use, an adjustable valve in one of said pipes for varying the proportional relation between the amounts of renewal liquid passing through said pipes, and means actuated by said density responsive means for supplying renewal liquid to said pipes.

4. In an apparatus for controlling the density of a liquid flowing through a system wherein said liquid is circulated to and from a place of use, density responsive means disposed in said system for actuation by said liquid, means for admitting proportional amounts of renewal material to said liquid at spaced points in said system, one of said points being so located and constructed in advance of said density responsive means that the entire volume of renewal material admitted at such point together with the liquid to which it is added is mixed and flows past said density responsive means before passing to said place of use, the other of said points being located beyond said density responsive means so that the renewal material there admitted will not affect said density responsive means before passing to said place of use, and means actuated by said density responsive means for controlling the flow of renewal material to said admission means.

CHARLES E. KERR.